United States Patent [19]

Lashyro

[11] Patent Number: 4,643,633

[45] Date of Patent: Feb. 17, 1987

[54] ROTARY TRANSFER DEVICE

[75] Inventor: Jeffrey A. Lashyro, Deerwood, Minn.

[73] Assignee: Minnesota Automation, Crosby, Minn.

[21] Appl. No.: 581,348

[22] Filed: Feb. 17, 1984

[51] Int. Cl.$^4$ ................................................ B66C 1/02
[52] U.S. Cl. .................................. 414/732; 198/474.1; 198/797; 414/756; 414/737
[58] Field of Search ............... 414/222, 225, 732, 736, 414/737; 198/478, 797, 802, 474.1; 271/95

[56] References Cited

U.S. PATENT DOCUMENTS

| | | | |
|---|---|---|---|
| 2,915,308 | 12/1959 | Matzen | 271/95 |
| 3,302,946 | 2/1967 | Anderson | 271/95 |
| 3,385,595 | 5/1968 | Benetar | 271/95 |
| 3,567,011 | 3/1971 | Pinkham | 198/478 |
| 3,937,458 | 2/1976 | Langen | 271/95 |
| 4,449,625 | 5/1984 | Grieben et al. | 198/478 X |
| 4,530,686 | 7/1985 | Everson | 493/315 |

Primary Examiner—Robert J. Spar
Assistant Examiner—Donald W. Underwood
Attorney, Agent, or Firm—Anthony G. Eggink

[57] ABSTRACT

This invention provides a rotary transfer device or apparatus for the pickup, transfer and deposit of articles. The rotary transfer device has a drive source, a frame structure and an article pickup and deposit mechanism that travels in a predetermined, but changeable, path which has at least two apex positions of travel. The rotary transfer device includes a first stationary gear mounted to the frame structure which provides a first rotary motion for the articles transferred by the device. A first planetary gear is provided for rotation about the first stationary gear, and structure for rotating the first planetary gear about the first stationary gear is provided to produce the rotation. A second stationary gear mounted for rotation with the first planetary gear is provided to produce a secondary motion effect for the articles to be transferred by the device. A second planetary gear is provided for rotation about the second stationary gear and second structure for rotating the second planetary gear about the second stationary gear is provided to provide the secondary rotary motion. An article transfer mechanism with structure to pickup and deliver articles for rotation with the second planetary gear is provided so that the rotary transfer device or apparatus permits the article transfer mechanism to transfer articles from and to a plurality of positions in a plurality of paths to facilitate the size, shape and location of articles to be transferred.

21 Claims, 6 Drawing Figures

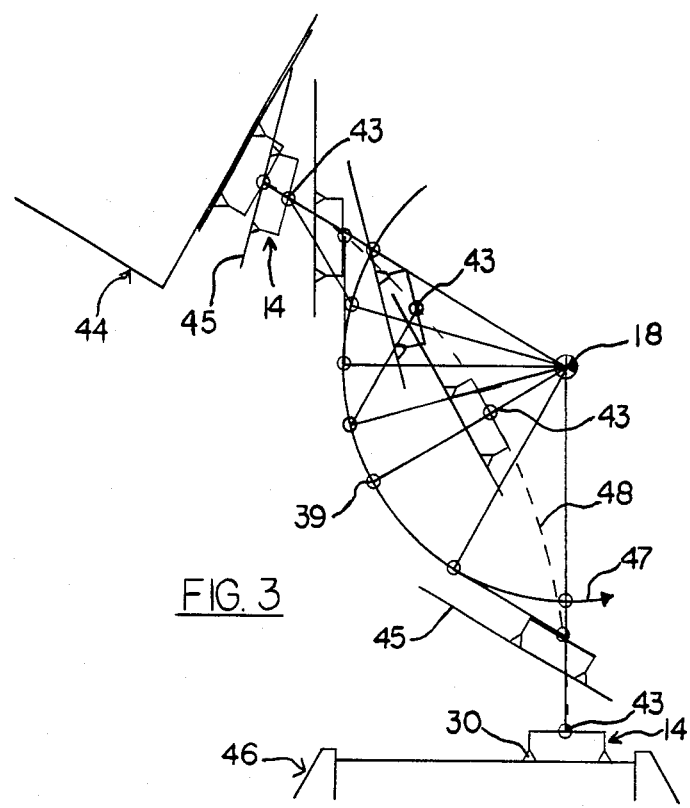
FIG. 3
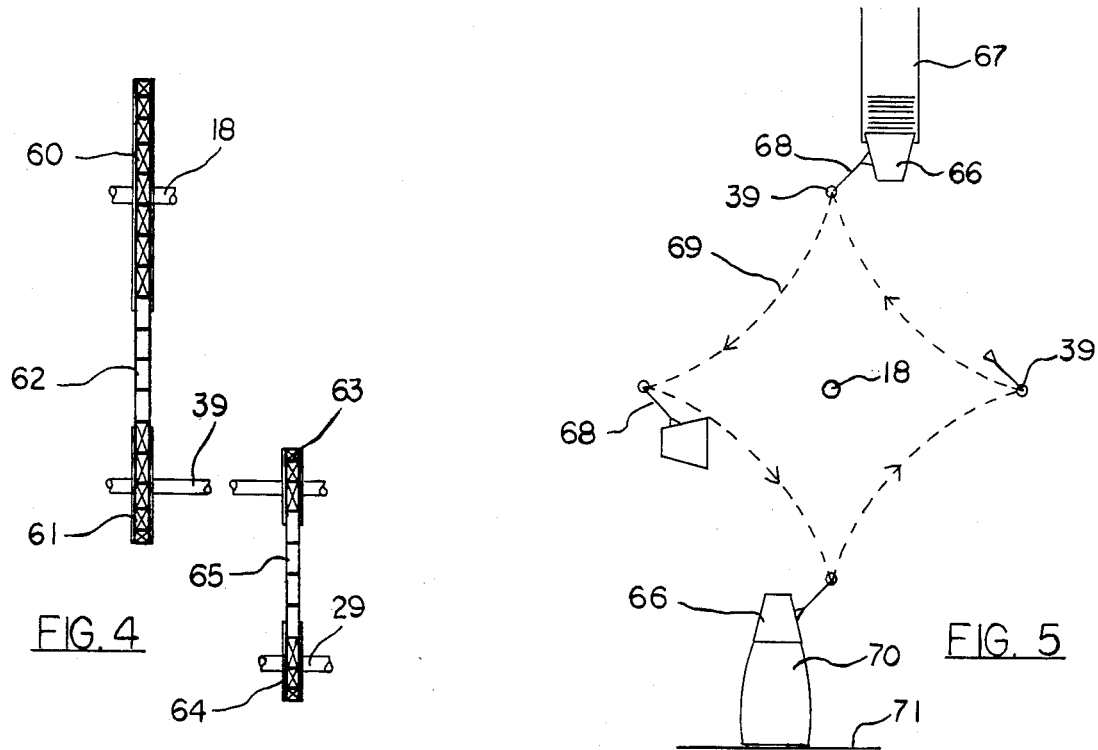
FIG. 4
FIG. 5

ROTARY TRANSFER DEVICE

BACKGROUND OF THE INVENTION

This invention relates to a rotary transfer device for the pickup, transfer and delivery of articles. Particularly, this invention relates to a rotary transfer device having a plurality of rotary movements to enable the device to transfer articles from and to a plurality of predetermined locations and in a plurality of transfer paths.

It has become increasingly necessary and desirable in mechanized manufacturing, assembly and packaging operations to enable the pickup, transfer and delivery of articles of various shapes and dimensions in the most reliable, precise and high speed manner. And, although many types of such devices have been developed, the utilization of rotary transfer devices have been found to consistently enable manufacturers, and the like, to reach this desired result.

However, due to the many configurations of manufacturing equipment and due to the varying shapes and sizes of the articles produced and processed, it has become increasingly difficult for such manufacturers and assemblers to find suitable article transfer mechanisms which enable the precise and reliable pickup, transfer and deliver these articles, without damage, from one location to another for subsequent manufacturing operations.

Although various means have been taught to transfer articles from one location to another, and although one reliable and desirable means is the utilization of a rotary transfer mechanism, shortcomings and limitations with respect to the effective transfer and delivery of articles still exist. Particularly, these limitations and shortcomings include the inability of the transfer mechanism to pickup and deliver articles of distinct shapes and sizes, the pickup and delivery of articles to and from a range of locations, and the inability to pickup and deliver articles in a straight line, reliable manner so that the transferred articles are not damaged and precisely placed in a predetermined location.

These shortcomings and limitations can generally be traced to the inherent limitations in the design of the transfer mechanisms themselves. Particularly, these shortcomings and limitations are due to the limited degree of travel and adjustability of the transfer mechanism.

The rotary transfer device of this invention is designed to overcome the limitations of the prior known mechanisms by the addition of added and controllable motion to the article transfer mechanisms to a rotary transfer device. This added secondary or tertiary motion to a rotary transfer device enables the manufacturer or assembler to transfer articles to and from a plurality of positions in a variety of transfer paths to facilitate the size, shape and location of the articles to be transferred. Particularly, the straight line motion of the transfer mechanism at the pickup and delivery points enables this versatility and the added benefit of reliability because of the precise contact that results from this motion of the transfer mechanism to the pickup and delivery locations of the articles to be transferred.

SUMMARY OF THE INVENTION

This invention provides a rotary transfer device or apparatus for the pickup, transfer and deposit of articles. The rotary transfer device has a drive source, a frame structure and an article pickup and deposit mechanism that travels in a predetermined, but changeable, path which has at least two apex positions of travel.

The rotary transfer device includes a first stationary gear mounted to the frame structure, and which provides a first rotary motion for the articles transferred by the device. A first planetary gear is provided for rotation about the first stationary gear, and means for rotating the first planetary gear about the first stationary gear is provided to produce the rotation. The first rotation means consists of a first idler gear meshingly disposed between the first stationary and planetary gears or a continuous chain meshingly disposed about these two gears.

A second stationary gear mountd for rotation with the first planetary gear is provided to produce a secondary motion effect for the articles to be transferred by the device. A second planetary gear is provided for rotation about the second stationary gear and second means for rotating the second planetary gear about the second stationary gear is provided to provide the secondary rotary motion. The second rotation means, likewise, consists either of an idler gear engagingly disposed between the second stationary gear and the second planetary gear, or a second continuous chain meshingly disposed about the second stationary and planetary gears.

An article transfer mechanism having means to pickup and deliver articles for rotation with the second planetary gear is provided so that the rotary transfer device or apparatus permits the article transfer mechanism to transfer articles from and to a plurality of positions in a plurality of paths to facilitate the size, shape and location of articles to be transferred. The article transfer mechanism is generally comprised of a mechanism having a hollow shaft for the timed application of vacuum from a vacuum source and at least one adjustable vacuum cup in communication with the hollow shaft. The assembly is generally disposed outwardly from the second planetary gear.

The rotary transfer device provides an article transfer mechanism having at least two sources of rotation which when timed by the use of predetermined gearing ratios provides a transfer device having an infinite possibility of article pickup and delivery locations and a variety of article transfer paths to accomodate the processes and machinery equipment utilized by the user of the device.

The use of devices according to this invention, whether having secondary or tertiary motion permits the vacuum cups of the article transfer mechanism to travel a straight line path at its respective apex points of travel so that a greater variety of articles can be effectively transferred and deposited, without damage, for subsequent manufacturing or processing purposes. And, the interrelationship of the gearing ratios utilized in the devices provides a user with means to accomplish a wide range of article transfer paths.

For example, a first planetary gear to first stationary gear ratio would ordinarily determine the number of apex positions of travel for the remaining outer elements of the device. However, a second planetary to second stationary gear ratio of one or less will cause the article transfer mechanism to continually face in an outward position during its course of travel sothat relatively large articles can be effectively transferred without the need to expand the physical dimensions of the device itself.

Also provided are rotary transfer devices having various configurations of plate members and counter balance members so that the devices function in a stable manner. And, provided are rotary transfer devices having vacuum valving and transfer lines which precisely control the application of vacuum at the article transfer mechanisms, particularly at their apex positions of travel.

These and other benefits of this invention will become clear from the following description, by reference to the drawings.

BRIEF DESCRIPTION OF THE DRAWINGS

FIG. 3 is a schematic, geometric, time-location diagram which shows the transfer path of an article from a pickup point at an upper apex position to a placement location at a lower apex position;

FIG. 4 is a schematic frontal plan view of an alternative means for rotating the planetary gears about the respective stationary gears;

FIG. 5 is schematic, geometric, time-location diagram which shows the transfer path of an article from the article storage magazine to a conveyor deposit location.

DESCRIPTION OF THE PREFERRED EMBODIMENTS

Figure 1:
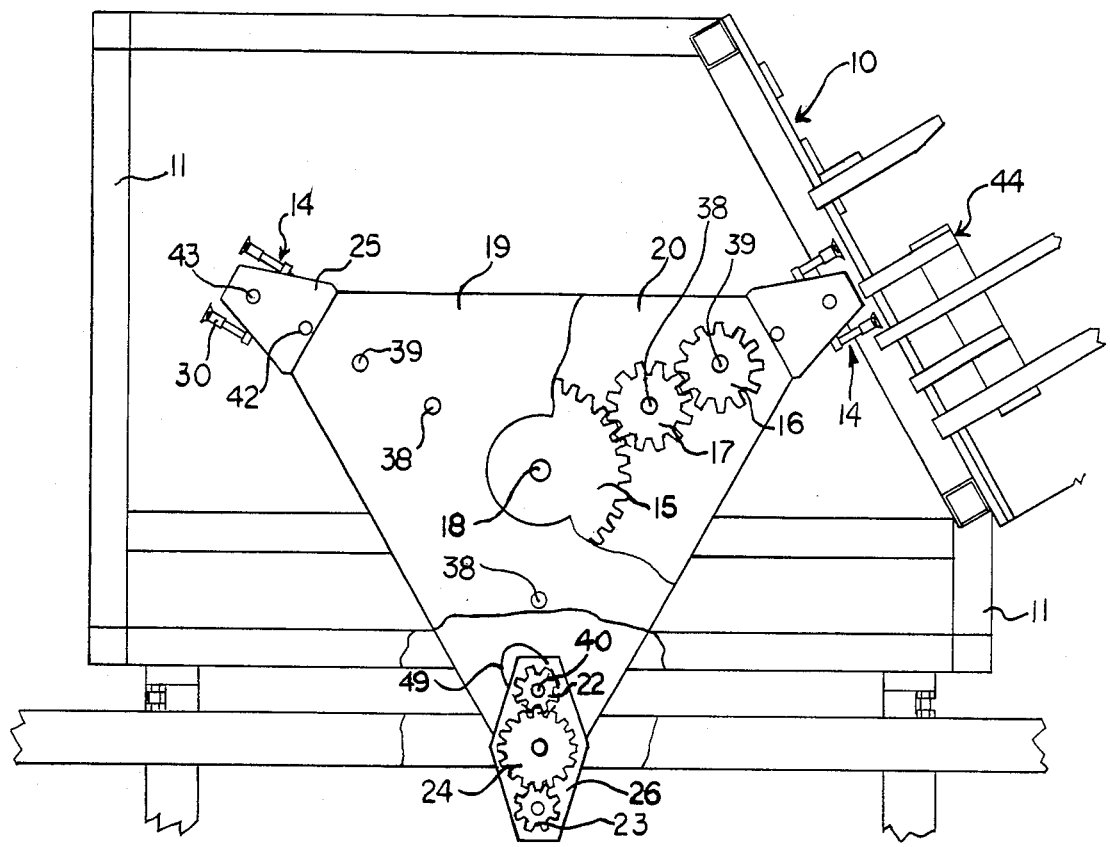
FIG. 1 is a schematic side plan view, with cut-away portions, of the rotary transfer device of this invention.
Figure 2:
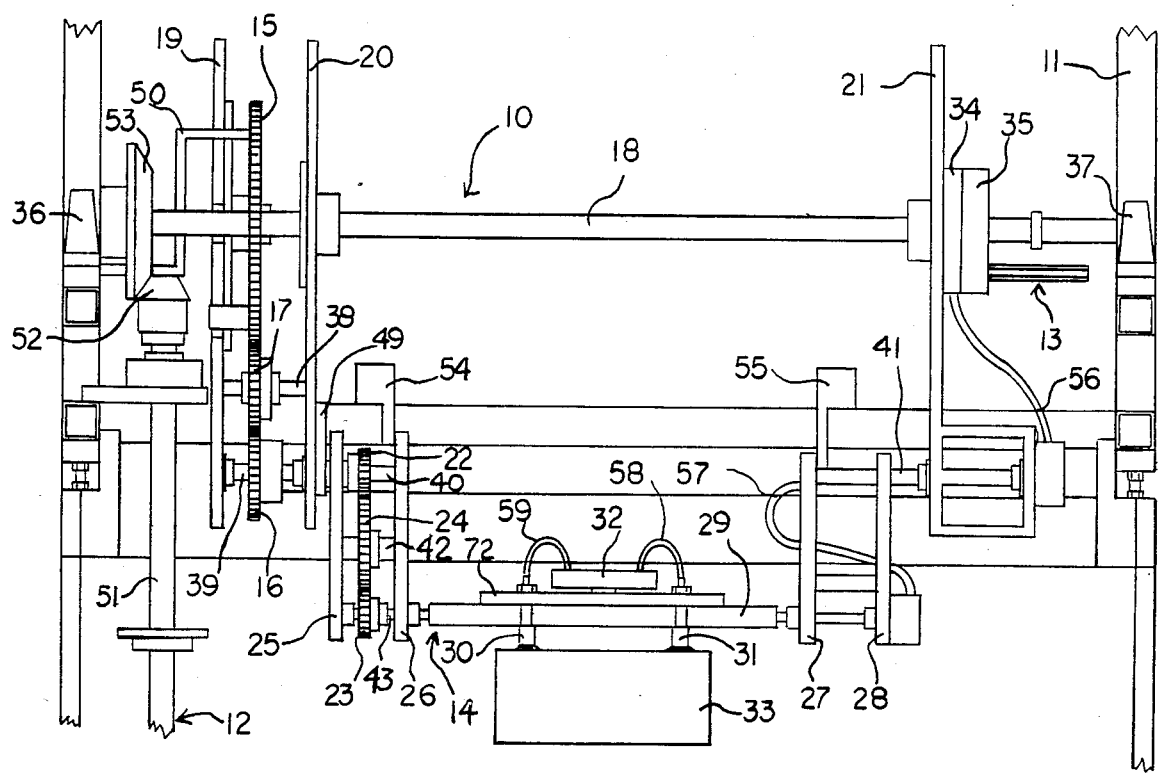
FIG. 2 is a schematic frontal plan view of the rotary transfer device of this invention.

Referring to FIGS. 1 and 2, a rotary transfer device or apparatus, generally indicated by numeral 10, is there illustrated according to the teachings of this invention. The rotary transfer device 10 is shown as having a frame structure or network 11, a drive source 12, and a vacuum source conduit 13, which is connected to a vacuum pump (not shown).

The frame structure 11, as shown, is generally of a rigid, tubular metal construction, or the like, which is designed for receiving the remaining elements of the device. The frame structure 11 can be constructed in a variety of configurations for installation in conjunction with a variety of mechanized operations, machines or devices, such as assembly lines, packaging equipment or conveyor systems, which require the removal, transfer and/or deposit of certain articles, such as cartons, cups, labels, etc. The frame structure 11 is generally a free standing unit placed on the floor in proximity to a conveyor system, or the like, but it can also be constructed in conjunction with such equipment.

The rotary transfer device 10 includes a main or central shaft 18 mounted by journals 36 and 37 to frame structure 11. Shaft 18 is rotatable and is shown driven by drive source 12, such as a motor. A vertical drive shaft 51 is connected to the drive source 12 one end and a bevel drive gear 52 at its opposite, upper end. A bevel drive gear 53 in communication with bevel drive gear 52 is mounted to central shaft 18 to drive it and the components attached or mounted thereto, and those in communication with those components. Although not specifically shown in the drawings, the drive source 12, such as a direct drive motor connected for rotating drive shaft 51, may alternatively consist of a gear/chain or similar arrangement, wherein a gear is centrally disposed about shaft 18 and a continuous chain driven by the motor is utilized to drive that gear.

Mounted to central shaft 18 and for rotation therewith are two opposing first side plate members 19 and 21. An additional first side plate member 20 is illustrated in FIG. 2, and which provides a stabilizing as well as a protective function to the rotary transfer device 10.

Important to the functionality of device 10 is the first stationary gear 15 which is immovably fixed to the frame structure 11 by means of an anchor bar member 50. Thus, as the central shaft 18 is rotated, plate members 19, 20, and 21 rotate therewith while gear 15 remains in a fixed, stationary position.

A first planetary gear 16 is provided for rotation about the stationary gear 15. A first rotating means is provided for this purpose, and as shown in FIGS. 1 and 2, it consists of a first idler gear 17 which meshes with gears 15 and 17. As is further shown, a shaft 38 extends through idler gear 17 and between plates 19 and 20, while shaft 39 extends through planetary gear 16 and is mounted between these same two plates. Thus, as plate members 19 and 20 are rotated by shaft 18, idler gear 17 is driven by virtue of its communication with the stationary gear 15 and planetary gear 16 is rotated in the opposite direction due to its meshing communication with the idler gear 17.

As will be discussed further, the gear ratio between that of the first planetary gear 16 and the first stationary gear 15 is important to the functionality of the rotary transfer device of this invention. Essentially, this gear ratio determines the location of the apex or outward positions of the elements in fixed communication with the planetary gear 16. For example, a gear ratio of 3:1, wherein the circumference of the stationary gear 15 is three times greater than that of planetary gear 16, necessarily results in three such apex positions. And, due to the similar teeth arrangements of these gears, the precise repeatability of these apex positions enables the device to perform a predetermined function at these locations. As can be appreciated, the circumference or diameter of idler gear 17 does not affect the number of apex positions, but only affects the outward distance of the shaft 39 relative to the central shaft 18.

Again, as shown in FIGS. 1 and 2, a shaft 40 extends inwardly from side plate member 20, and a pair of second side plate members 25 and 26 are mounted thereto for rotation with shaft 40, which preferably is an extension of shaft 39. Importantly, a second stationary gear 22, which is stationary with respect to plates 19 and 20, is mounted between the second side plates 25 and 26 and about shaft 40. The stationary gear 22 is held stationary with respect to plate 20, for example, by means of an anchor member 49, which is in rigid communication with stationary gear 22 and connectably mounted to plate 20.

Spacially opposite plates 25 and 26 are plates 27 and 28, which are mounted for rotation to shaft 41, which in turn is mounted for rotation to plate member 21. Between plate members 26 and 27 is the article transfer mechanism 14. As shown in FIG. 2, the article transfer mechanism 14 includes a hollow rotatable transfer shaft 29, a vacuum manifold 32 and a pair of outwardly extending vacuum cup members 30 and 31. An article 33 is shown being held by the vacuum cups 30 and 31. The vacuum cup members 30 and 31 are adjustably mounted to a slotted mounting plate 72 which permits the adjustment of the vacuum cups to conform to the requirements of the article 33 to be transferred. Additionally, the number of vacuum cups of article transfer means 14 are changeable to properly grasp the article 33, as the dimensions of article 33 require. Although one article transfer mechanism is shown in FIG. 2, it is possible and most often preferred to have one such mechanism located in the device for each apex position of travel to maximize the efficiency of the device.

FIG. 1 shows the device 10 to have two article transfer mechanisms 14. Although the device 10 structure, as shown, is designed to have three such transfer mechanisms 14, the third has been omitted to more clearly illustrate the second rotary mechanism. The transfer mechanisms 14 are driven, as shown, by the meshing idler gear 17 and planetary gear 16 which rotate relative to the stationary gear 15. This same rotating means is used to drive the other transfer mechanisms 14, as shown by the shafts 38 and 39 in plate member 19.

In a manner similar to the first rotary mechanism discussed above, the second rotary mechanism is shown to consist of a second idler gear 24 mounted for rotation to shaft 42, and a second planetary gear 23 mounted for rotation to shaft portion 43 of shaft 29. Thus, as the first rotary mechanism is rotated about the first stationary gear 15, idler gear 24 and planetary gear 23 are rotated about the second stationary gear 22 which results in the rotational movement of the article transfer mechanism 14.

Alternatively, as shown in FIG. 4, the first rotating means can consist of a first continuous chain 62 which meshingly engages a first stationary sprocket gear 60 and a first planetary sprocket gear 61. Similarly, the second rotating means is shown to consist of a second continuous chain 65 which meshingly engages a second stationary sprocket gear 63 and a second planetary sprocket gear 64.

The control of vacuum at the vacuum cups 30 and 31 is effectuated via their respective hollow stems which are in communication with manifold 32 and the hollow shaft 29. The vacuum application is ultimately controlled, particularly at the apex positions of travel, by interiorly slotted and ported vacuum valves 34 and 35 (i.e., metal valve with slots and a rotating nylon valve with aligned ports), which are in communication with a vacuum source via conduit 13.

As shown in FIG. 2, the vacuum source conduit 13 connectably communicates with the cooperating slotted and ported vacuum valves 34 and 35. These interiorly slotted valves are generally known in the art, and they produce the predetermined application of vacuum at the article transfer mechanism 14 via a number of hoses and hollow shafts. Specifically, a vacuum hose or line 56 extends from the slotted valves 34 and 35 and is in communication with hollow shaft 41, which is in communication with hollow shaft 29 by means of vacuum hose 57. The vacuum manifold 32 is communication with hollow shaft 29, and a pair of vacuum hoses 58 and 59 respectively communicate with vacuum cups 31 and 30.

The cooperating slotted vacuum valves 34 and 35 are preferably rotationally adjustable for fine tuning the precise locations of vacuum operability at the apex positions of the article transfer mechanisms. And, the valves are, preferably, provided with cooperating features which stop the rotary device when the article supply has been depleted or when a product source on which the articles are to be placed has been stopped. These features are provided by the use of additional ports in the nylon valve, and the use of electric eyes, micro-switches and the use of solenoid valves.

Depending upon the nature and speed of the rotary transfer device, it may be necessary to attach counter balance weights 54 and 55 at the interior upper portions of plate members 26 and 27, for example, as shown in FIG. 2 so that the device rotates in a smooth continuous manner. These counter balances become particularly desirable when the second transfer mechanism has a ratio of 1:1 or less. In the latter case, the counter balances may consist of opposing balance weights 54 and 55, as shown, or, alternatively, one interially disposed weighted member may be mounted between plates 26 and 27.

As can now be appreciated, the addition of the second rotary mechanism results in the additional controllable movement of the article transfer device 14. For example, the ratio of the second planetary gear 23 to that of the second stationary gear 22 permits the rotary transfer device 10 to yield precise movement of the article transfer mechansim 14 as will become clear with respect to the discussion in reference to FIG. 3 and 5.

Additionally, the gear ratio of gear 23 to 22 also permits the transfer mechanism 14 to transport articles 33 in a specific manner. For example, a ratio of 1:1 or less results in the transfer of articles 33 so that the article is always located to an outward position with respect to device 10. This arrangement is particularly useful for the movement and placement of relatively large articles, such as cartons, for example, because the dimension requirements of the rotary transfer device 10 do not need to accomodate the movement of these large articles in the interiorly disposed portions of the device.

FIG. 3 is a geometric, time-location diagram of a rotary transfer device 10 having a 3:1 gear 15 to gear 16 ratio and a 1:1 gear 22 to gear 23 ratio. Thus, as discussed above, the transfer device has a path of travel of its article transfer mechanism 14 having three apex positions and one which keeps the transported article 45 disposed in an outward position. The rotary transfer device is shown to pick-up articles 45 from an article supply holder or magazine 44 at one apex position and then transferring the articles to a predetermined place of deposit 46, such as between the flights 46 of a conveyor. As is illustrated by path 48, the article transfer mechanism due to the cooperation of the first and second rotary transfer mechanisms, the transfer mechanism assimilates straight line motion when approaching the respective apex positions. Importantly, the straight line motion prevents damage, such as scuffing, to the articles by the article transfer mechanisms.

FIG. 5 illustrates another time-location diagram of a process which has been found useful in the packaging industry and which utilizes the teachings of this invention having a 4:1 gear ratio of the first rotary mechanism to yield 4 apex positions and a 2:1 gear ratio of the second rotary mechanism. There shown, a magazine 67 with a supply of individual cups 66 utilizes the rotary device to transfer cups 66 via path 69 to the top of bottles 70 passing on conveyor 71 beneath the path of travel 69. A transfer mechanism with a single vacuum cup 68 engages the side of a cup 66, and because of the straight line motion easily removes it from magazine 67. At its lower apex of travel, the vacuum cup 68 drops the cup 66 in an inverted position on the top of bottle 70. Because cups 66 are often of a lightweight and rather fragile material, i.e., a poly-foam material, and because of the precise straight line placement requirements of the cups 66 onto bottles 70, a rotary transfer device having an article transfer mechanism subject to secondary rotary motion, this pick-up and delivery process can be accomplished.

Thus, FIGS. 3 and 5 illustrate the versatility and wide range of use provided by the multiple rotary transfer mechanisms of the devices according to the teachings of the invention. In effect, the proper selection of gear ratios for the respective rotary transfer mechanisms provides a user with the ability to transfer articles from and to any desired location. And, once the devices are initially set for operation, the direct operative nature of the rotating means provided, results in constant and reproducable transfer paths for the articles and straight line pickup and delivery motions of the article transfer mechanisms at the respective apex positions.

Figure 6:
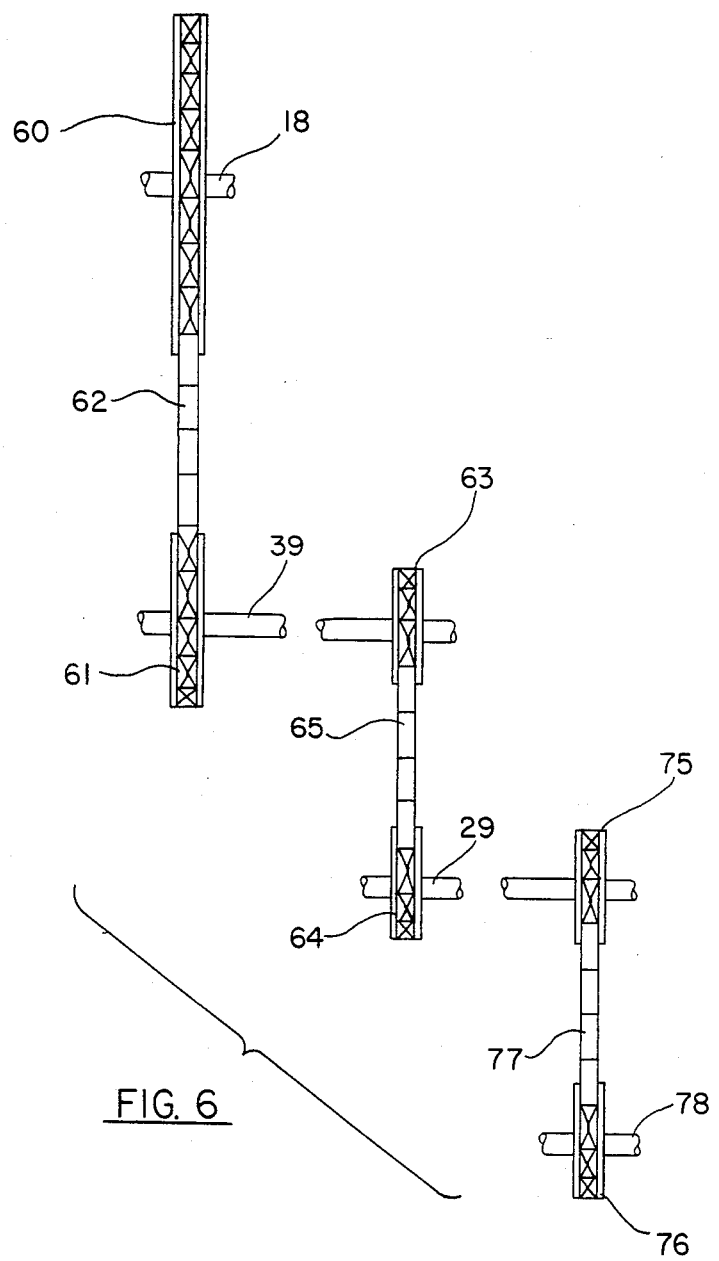
FIG. 6 is a schematic frontal plan view showing means for rotating planetary gears relative to their respective stationary gears.

Although the description of the rotary transfer devices according to the teachings of this invention has primarily been directed towards devices having a primary and a secondary rotary mechanism, it is within the purview of this invention to employ additional rotary mechanisms, as shown in FIG. 6 which would yield even greater straight line motion effects at the predetermined apex positions. FIG. 6 shows the additional or tertiary rotary mechanism drive to consist of a third continuous chain 77 which meshingly engages a third stationary sprocket gear 75 on shaft 29 and a third planetary sprocket gear 76 on shaft 78.

As many changes are possible to the embodiments of this invention, utilizing the teachings thereof, the description above and the accompanying drawings, should be viewed in the illustrative and not in the limited sense.

That which is claimed is:

1. A rotary transfer apparatus for the pickup, transfer and delivery of articles comprising:
   (a) a frame structure,
   (b) a first stationary gear mounted to said frame structure, the first stationary gear additionally having a rotatable shaft extending through its center,
   (c) a supporting plate member fixed to the rotatable shaft for rotation therewith,
   (d) a first planetary gear mounted on said plate member for rotation about said first stationary gear,
   (e) drive means for rotating said shaft,
   (f) means for rotating said first planetary gear relative to said first stationary gear,
   (g) a second stationary gear mounted on said plate member for rotation with said first planetary gear, said second stationary gear additionally having an outward rotatable shaft through its center and being fixed for rotation with said plate member,
   (h) an outward plate member fixed to the outward rotatable shaft for rotation therewith,
   (i) a second planetary gear fixed to the outward plate member for rotation about said second stationary gear,
   (j) means for rotating said second planetary gear relative to said second stationary gear, and
   (k) an article transfer mechanism connected to said secondary gear and having means to pickup and deliver articles for rotation with said second planetary gear,
whereby, said rotary transfer apparatus having said first and second stationary gears and said first and second planetary gears permits said article transfer mechanism to transfer articles from and to a plurality of positions in a plurality of paths to facilitate the size, shape and location of articles to be transferred.

2. The rotary transfer apparatus of claim 1, wherein said means for rotating said first planetary gear relative to said first stationary gear is comprised of a first idler gear mounted for meshing engagement between said first stationary and planetary gears.

3. The rotary transfer apparatus of claim 1, wherein said means for rotating said first planetary gear relative to said first stationary gear is comprised of a first continuous chain mounted for meshing engagement about said first planetary and stationary gears.

4. The rotary transfer apparatus of claim 1, wherein said means for rotating said second planetary gear relative to said second stationary gear is comprised of a second idler gear mounted for meshing engagement between said second planetary and stationary gears.

5. The rotary transfer apparatus of claim 1, wherein said means for rotating said second planetary gear relative to said second stationary gear is comprised of a second continuous chain mounted for meshing engagement about said second planetary and stationary gears.

6. The rotary transfer apparatus of claim 1, wherein said article transfer mechanism is comprised of a vacuum operable structure having at least one vacuum cup extending therefrom to engage articles for pickup, transfer and delivery.

7. The rotary transfer apparatus of claim 1, wherein said second planetary gear and said secondary stationary gear have a ratio of 1:1 or less to maintain the the article transfer mechanism to generally the outside during rotation of the transfer apparatus.

8. A double rotating transfer mechanism having means to pickup and release articles, said transfer mechanism comprising:
   (a) a frame network to support the remaining elements of the transfer mechanism,
   (b) a first stationary gear fixed to the frame network, the first stationary gear having a rotatable shaft extending through its center,
   (c) a pair of opposing supporting plate members fixed at one end of the rotatable shaft of the first stationary gear for rotation with said rotatable shaft,
   (d) at least one outward rotatable shaft fixed for rotation to the pair of plate members and being disposed parallel and radially outward from the rotatable shaft extending through the first stationary gear,
   (e) a first planetary gear fixed for rotation with the outward rotatable shaft,
   (f) drive means between the first stationary gear and the first planetary gear,
   (g) a second stationary gear positioned with the outward rotatable shaft through its center and being fixed for rotation with one of the plate members,
   (h) a pair of opposing outward plate members fixed for rotation with the outward rotatable shaft,
   (i) at least one article transfer mechanism having a rotatable shaft extending between the pair of outward plate members and being radially outward the outward rotatable shaft,
   (j) an outward second planetary gear fixed for rotation with the rotatable shaft of the article transfer mechanism, and
   (k) drive means between the second stationary gear and the outward second planetary gear,
whereby, the rotation of the supporting plate members along with the shaft member extending therethrough rotates the article transfer mechanism to at least two predetermined apex positions for the pickup and release of articles.

9. The rotary transfer mechanism of claim 8, wherein said drive means between said first planetary gear and said first stationary gear is comprised of a first idler gear mounted for meshing engagement between said first stationary and planetary gears, and wherein said drive means between said second planetary gear and said second stationary gear is comprised of a second idler gear mounted for meshing engagement between said second planetary and stationary gears.

10. The rotary transfer mechanism of claim 8, wherein said drive means between said first planetary gear and said first stationary gear is comprised of a first continuous chain mounted for meshing engagement about said first planetary and stationary gears, and wherein said drive means between said second planetary gear and said second stationary gear is comprised of a second continuous chain mounted for meshing engagement about said second planetary and stationary gears.

11. The rotary transfer mechanism of claim 8, wherein said article transfer mechanism is comprised of a vacuum operable structure having at least one vacuum cup extending therefrom to engage articles for pickup, transfer and delivery.

12. The rotary transfer mechanism of claim 8, wherein said second planetary gear and said second stationary gear have a ratio of 1:1 or less to maintain the the article transfer mechanism to generally the outside during rotation of the transfer apparatus.

13. In an article pick-up and deposit device having a drive source, a frame and an article pick-up and deposit mechanism that travels in a changeable, predetermined path which has at least two apex positions, a drive mechanism for the article pick-up and deposit mechanism comprising:
 (a) a first rotatable plate body member having a shaft and being mounted for rotation to the frame and being driven by the drive source,
 (b) a first stationary gear mounted to the frame and having the plate body shaft extending through its center,
 (c) a second rotatable plate body member having a second shaft and being mounted for rotation to the first rotatable plate body member about the first stationary gear,
 (d) a first connecting drive means operative between the first stationary gear and the second rotatable plate body member,
 (e) a second stationary gear fixedly mounted to the second rotatable plate body member,
 (f) a rotatable article pick-up and deposit mechanism mounted to the shaft of the second rotatable plate body member for rotation with said second rotatable body member about the second stationary gear, and
 (g) a second connecting drive means operative between the second stationary gear and the article pick-up and deposit mechanism.

14. The rotary transfer apparatus of claim 13, wherein said first connecting drive means for rotating said second rotatable body member about said first stationary gear is comprised of first planetary gear and a first idler gear mounted for engagement with said first stationary gear, and wherein said second connecting drive means for rotating said article pick-up and deposit mechanism about said second stationary gear is comprised of a second planetary gear and a second idler gear mounted for engagement with said stationary gear.

15. The rotary transfer apparatus of claim 13, wherein said first connecting drive means for rotating said second rotatable body member about said first stationary gear is comprised of a first planetary gear and a first continuous chain mounted for meshing engagement about said first planetary and stationary gears, and wherein said second connecting drive means for rotating said article pick-up and deposit mechanism about said second stationary gear is comprised of a second planetary gear and a continuous chain mounted for meshing engagement about said second planetary and stationary gears.

16. The rotary transfer apparatus of claim 13, wherein said article pick-up and deposit mechanism is comprised of a vacuum operable structure having at least one vacuum cup extending therefrom to engage articles for pickup, transfer and delivery.

17. The rotary transfer apparatus of claim 13, wherein said second planetary gear and said second stationary gear have a ratio of 1:1 or less to maintain the the article transfer mechanism to generally the outside of the device during rotation of the transfer apparatus.

18. A rotary transfer apparatus for the pickup, transfer and delivery of articles comprising:
 (a) a frame structure,
 (b) a first stationary gear having a first rotatable shaft member extending from its center mounted to said frame structure, said apparatus further having drive means to drive said shaft,
 (c) a supporting plate member fixed for rotation with said first shaft member,
 (d) a first planetary gear mounted on said supporting plate member for rotation about said first stationary gear,
 (e) means for rotating said first planetary gear relative to said first stationary gear,
 (f) a plurality of second stationary gears, one of said second stationary gears being fixedly mounted for rotation with said first planetary gear, each said second stationary gears having a second rotatable shaft,
 (g) an outward plate member fixed for rotation with each said second rotatable shaft,
 (h) a plurality of second planetary gears, one of said second planetary gears being mounted on each said outward plate member for rotation about each said second stationary gear, each said planetary gear being fixedly mounted for rotation with the secondary gear of the subsequent plate member, one of said second planetary gears being the outermost second planetary gear from said first planetary gear,
 (i) means for rotating each of said second planetary gears relative to said second stationary gears, and
 (j) an article transfer mechanism having means to pickup and deliver articles for rotation with the outermost second planetary gear,
whereby, said rotary transfer apparatus having said first and second stationary gears and said first and second planetary gears permits said article transfer mechanism to transfer articles from and to a plurality of positions in a plurality of paths to facilitate the size, shape and location of articles to be transferred, and to facilitate the pickup and delivery of the articles in a straightline manner.

19. The rotary transfer apparatus of claim 18, wherein said means for rotating said first planetary gear relative to said first stationary gear is comprised of a first idler gear mounted for meshing engagement between said first stationary and planetary gears, and wherein said means from rotating said second planetary gears relative to said second stationary gears are comprised of a plurality of second idlers gears mounted for meshing engagement between said second planetary and stationary gears.

20. The rotary transfer apparatus of claim 18, wherein said means for rotating said first planetary gear relative to said first stationary gear is comprised of a first continuous chain mounted for meshing engagement about said first planetary and stationary gears, and wherein said means for rotating said second planetary gears relative to said second stationary gears are comprised of second continuous chains mounted for meshing engagement about said second planetary and stationary gears.

21. The rotary transfer apparatus of claim 18, wherein said article transfer mechanism is comprised of a vacuum operable structure having at least one vacuum cup extending therefrom to engage articles for pickup, transfer and delivery.

* * * * *